United States Patent [19]

Fleming

[11] Patent Number: 5,083,841

[45] Date of Patent: Jan. 28, 1992

[54] WHEEL COVER MOUNTING ASSEMBLY

[75] Inventor: Alvin R. Fleming, Barnhart, Mo.

[73] Assignee: Siegel-Robert, Inc., St. Louis, Mo.

[21] Appl. No.: 498,008

[22] Filed: Mar. 23, 1990

[51] Int. Cl.$^5$ ................................................ B60B 7/06
[52] U.S. Cl. .......................... 301/37 TP; 301/37 CD; 301/37 P
[58] Field of Search ............ 301/37 R, 37 CD, 37 C, 301/37 PB, 37 TP

[56] References Cited

U.S. PATENT DOCUMENTS

| | | |
|---|---|---|
| 3,873,161 | 3/1975 | Kretschmer . |
| 3,918,763 | 11/1975 | Harris . |
| 3,970,346 | 7/1976 | Kretschmer . |
| 4,231,619 | 11/1980 | Beisch et al. . |
| 4,363,520 | 12/1982 | Connell . |
| 4,383,716 | 5/1983 | Osborn . |
| 4,461,514 | 7/1984 | Schwarz . |
| 4,523,789 | 6/1985 | Schwarz . |
| 4,598,952 | 7/1986 | Arvidsson . |
| 4,679,861 | 7/1987 | Narita et al. ............. 301/37 CD X |
| 4,740,038 | 4/1988 | Okano et al. . |
| 4,749,234 | 6/1988 | Hemplemann ............. 301/37 PB X |
| 4,895,414 | 1/1990 | Fleming et al. ............. 301/37 PB |

FOREIGN PATENT DOCUMENTS 2600284 12/1987 France ............ 301/37 CD

*Primary Examiner*—Russell D. Stormer
*Attorney, Agent, or Firm*—Armstrong, Teasdale, Schlafly & Davis

[57] ABSTRACT

An improved wheel cover attachment assembly is used with automotive vehicle wheels having a rim within an interior annular groove and a wheel wall facing the annular groove. The wheel cover has an annular recess with an inner wall. The wheel cover attachment assembly comprises a clip having trunk with a pressing head flange extending from near the top thereof in a direction toward the interior of the wheel. At the bottom of the clip are a pair of feet with angular toes which fit within the cover recess to be held therein. Near the top of the clip a pair of arms extend in a direction generally opposite that of the head flange. A plastic detent member fits within the arms. The detent has a projecting nose that extends in generally the same direction as the arms and in a generally opposite direction from the head flange. The outer surface of the detent nose extends slightly beyond the outer edge of the clip arms. When the wheel cover is moved toward the wheel for mounting, the head flange engages the wheel wall and flexes as it slides therealong. The detent nose engages the tire rim wall and slides thereagainst. The force against the detent nose as it moves to be inserted in the rim groove is counteracted by the force of the head flange in generally the opposite direction so that the installation forces do not deform the structure of the wheel cover. When the detent nose becomes aligned with the rim groove, the head flange presses the nose into the groove to retain the assembly and the cover to the wheel.

23 Claims, 1 Drawing Sheet

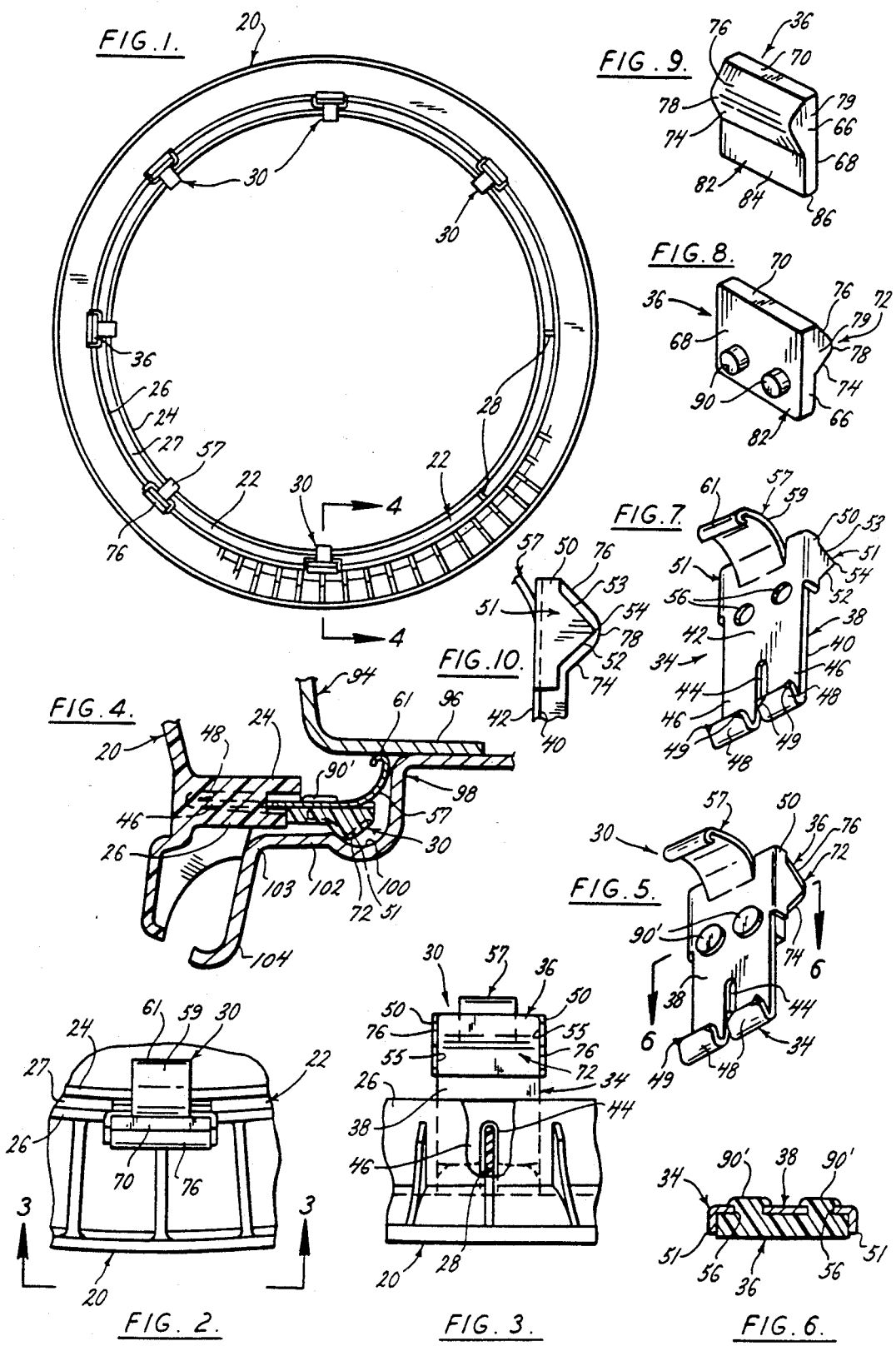

WHEEL COVER MOUNTING ASSEMBLY

BACKGROUND AND FIELD OF THE INVENTION

The present invention relates to the mounting and attachment of covers to wheels of vehicles. Covers protect the internal wheel and rim structure, most notably the nuts and bolts that hold the rim to the wheel. Covers also provide aesthetic designs with the wheels, in place of the unsightly wheel and rim structure. Heretofore various types of arrangements have been used to hold such covers to the tire rims.

Some prior wheel covers have used a complicated arrangement of annular spring rods that press multiple latching members outwardly into an annular groove of the tire rim. Other previous devices have lug members that are integrally molded with the rest of the wheel cover. These lugs act to engage in the annular tire groove. However, if one of such lugs breaks, the entire wheel cover is rendered useless.

Other devices heretofore used have included a clip that fits with the cover and which has a projection that fits within the tire rim groove. Examples of such clips are shown in U.S. Pat. No. 4,363,520 to Connell; U.S. Pat. No. 4,523,789 to Schwarz; and U.S. Pat. No. 4,231,619 to Beisch et al.

Other such arrangements are shown in U.S. Pat. No. 3,918,763 to Harris; U.S. Pat. No. 4,598,952 to Arvidsson; and U.S. Pat. No. 3,970,346 to Kretschmer.

The Connell patent shows various sorts of clips held in an annular recess of a wheel cover. FIG. 4 of the Connell patent shows a plastic retainer which has a part fitting within the tire rim groove and a part that projects into a recess in the wheel cover. However, such a retainer, being made of plastic, does not provide adequate gripping force needed to hold the wheel cover to the tire rim, nor does it provide necessary strength. The Connell clip further has separate molded legs 43a and 43b which are necessary to provide appropriate spring action during insertion. This militates against retention once the cover is installed. Further, in order to hold the Connell retainer to the cover, a hole in the recess wall is needed to receive a locking cam.

The Connell patent shows other retainers which are made of steel. The version of the clip shown in FIG. 2 has a U-bend that extends into an arm with a barb for engaging a tire rim. Sharp tabs help hold the clip within the recess of a cover. The Connell patent shows other versions of steel clips as well.

The Schwarz patent shows a clip with an arm having barbs to hold the arm in a cover recess. The clip has a U-shaped bend which extends into a curved arm having barbs for pressing against the surface of a tire rim.

The Beisch patent shows a clip with a tab fitting within a cover recess. The clip has an extended member which is bent at several turns. A barb projects from the clip and fits against the tire rim surface.

Such prior clip arrangements have shortcomings in providing gripping strength and in providing the resiliency needed to facilitate attachment and detachment of the cover. The U-bends and other bends in such prior devices provide less than desirable gripping action and strength, and create difficulties in manufacturing, as well. The steel composition of such clips can also create problems with the insertion and removal of the assemblies because of the lack of proper resilient action at appropriate times.

Difficulties have arisen with the assembly shown in U.S. Pat. No. 4,895,414 in that the assembly must rely on the length of the detent nose 74 and the clip arms 52 to hold the nose and arms within the tire rim groove 100. However, to move the nose 74 and arms 52 of that assembly into alignment with groove 100, the nose and arms must slide along the rim wall 102. As such sliding occurs, the longer length of the detent nose 74 and arms 52 push the clip trunk 38 inwardly as the clip 34 generally pivots about the bottom of the clip feet 48. This inward movement pushes the inner cover wall 24 too far inwardly. This extreme movement of the wall 24 causes the wall to be deformed inwardly, thus causing a weakening of the force that presses the detent nose 74 and clip arms 52 into the groove 100. This weakens the retention of the clip within the recess and permits the clip to work loose from its fixed position. As a result the clip can be detached from the cover and the cover can fall off of the wheel. Also, over a period of time the pressure against the inner wall 24 can crack it and thus cause failure of retention ability and disengagement of the cover from the wheel.

SUMMARY OF INVENTION

The present invention provides improvements over other assemblies and devices for holding wheel covers. The invention provides a retention assembly that has counteracting forces applied to it during insertion and during the retention action, which provides sufficient force to hold the assembly against the groove of the wheel rim but which avoids applying damaging force against a wheel cover wall. An embodiment of the invention features the assembly having a pressing member with an extension which extends in the direction toward the wheel wall so as to engage the wall during insertion and retention. The assembly also comprises a detent member with a projection which extends in a direction away from the projection of the pressing head extension, to fit within the tire rim groove. The pressing member can be a clip, and the projection can be a detent. The detent can be a separate member from the clip and can be of resilient self-lubricating material.

The clip pressing extension can be a flange that extends from near the top of the clip, with an end that curves back toward the clip body to provide spring action to push the clip and the detent projection into the groove.

The detent projection can be a nose with a slanted upper surface to facilitate insertion by allowing ease of sliding contact against the tire rim. The peak of the nose can be rounded. The undersurface of the nose can be slanted. The resilient self-lubricating nature of the detent nose promotes ease of insertion, as the slick nose surface glides more freely over the tire rim surface during attachment and detachment.

The invention can have means to hold the detent in place and to prevent sliding, and means to assist retention of the assembly should the detent fail or be worn down through use to no longer retain the assembly, such as a pair of arms extending from the clip alongside the detent projection. The detent can have lock bosses projecting into openings of the clip trunk, which bosses can be expanded through heating to hold the two pieces together during installation.

When the assembly is inserted, the pressing extension engages the wheel wall and can flex toward the trunk as it slides along the wheel wall. The tip of the detent nose engages the tire rim wall and slides thereagainst until the nose reaches the groove of the rim, whereupon the detent nose is pressed within the groove by the force of the extension. Once the detent nose enters the groove, the force from the pressing extension is reduced, but it continues to press the detent projection to maintain its engagement within the groove under normal operating forces.

Because the pressing extension provides the force that holds the detent nose within the groove, it is unnecessary to rely upon the greater length of the detent nose as shown in U.S. Patent No. 4,895,414, for retention. By eliminating the need to rely on such length of the detent nose, the inner wall of the cover recess is not pressed inwardly as much during insertion as in U.S. Pat. No. 4,895,414, and is not deformed or weakened to destroy the adequate application of force for holding the detent nose within the groove, or to weaken the ability of the assembly to remain inserted in the cover recess. Hence, a stronger and more durable assembly is provided.

If the detent for some reason cracks, or becomes worn down, or otherwise becomes incapable of retaining the assembly, the clip arms will engage the rim groove to retain the assembly with the wheel rim. The clip arms thus provide a secondary safety retention feature.

The clip can have means for engaging the cover such as a pair of projecting feet that fit within the recess of the cover formed by cover walls. The feet can have projecting toes which, when the feet are inserted, dig against a cover wall to resist removal of the clip. The clip can be unitary and easily stamped and formed from a sheet of metal.

The cover recess can have a rib therein. The clip can have legs that fit about the rib to resist movement of the assembly along the cover recess.

Spring steel composition for the clip and plastic such as nylon for the detent provide strength and resiliency and slick surface where needed.

The invention provides a forced balance retention assembly that interacts with the cover to promote a secure attachment without damage to parts of the cover. The assembly is easy to manufacture and install and can be economically produced. Such advantages are adaptable to covers and rims of all sizes and shapes.

It is therefore an object of the invention, as more broadly set forth in one or more of the claims, to provide the above features, and to:

Provide a wheel cover retention assembly that provides sufficient force against the wheel and rim structure to hold the assembly in a locked position but to permit installation and withstand normal operating forces in such a way that will not damage parts of the cover.

Another object is to provide a wheel cover retention assembly that does not cause excessive movement of the inner wall of a wheel cover recess used for retaining the assembly.

Moreover, an object is to provide a wheel cover retention assembly that provides self-lubricating action of a detent as the detent slides against parts of the rim structure during installation.

Yet another objective is to provide a wheel cover with the ability to have retention structure should the primary structure mechanism not function properly.

Still another object is to provide such an assembly that can be manufactured with ease and produced economically, and is easy to assemble and install.

DESCRIPTION OF THE DRAWINGS

FIG. 1 is a side elevation looking toward the interior of an automobile wheel cover, with a plurality of retention assemblies mounted within an annular recess of the cover;

FIG. 2 is an enlargement of a portion of the cover of FIG. 1, showing greater detail for one of the retention assemblies fitting within the annular recess;

FIG. 3 is a view taken on the line 3—3 of FIG. 2, with part of the wheel cover broken, showing a view looking at the outer side of an assembly, with a rib within the cover recess extending between the legs of an assembly clip;

FIG. 4 is a section view of the wheel cover, a retention assembly, and an automobile wheel and tire rim, with the detent member shown fitting within an annular groove of the rim and the head flange of the clip pressing against the outer wheel flange;

FIG. 5 is an isometric view of a retention assembly with the detent member mounted with the clip;

FIG. 6 is a section view taken on the line 6—6 of FIG. 5, showing the detent locking bosses expanded after heating;

FIG. 7 is an isometric view of a clip of the assembly, with the detent member removed;

FIG. 8 is an isometric view of the detent member without the clip, viewed looking at the rear side of the detent;

FIG. 9 is an isometric view of the detent without the clip, viewed looking at the rear side of the detent; and FIG. 10 is a side elevation of the side of a clip assembly.

DESCRIPTION OF A PREFERRED EMBODIMENT

FIG. 1 shows the inside of a plastic automobile wheel cover 20. The cover 20 has an annular recess 22. The recess 22 is formed by an inner annular wall 24, an outer annular wall 26, and a floor 27. The walls 24 and 26 taper from a larger upper opening to a more narrow width adjacent floor 27. A plurality of ribs 28 are equally spaced about the recess 22. Each rib 28 connects the walls 24 and 26. Two exposed ribs 28 are shown in FIG. 1, and one rib 28 is illustrated in FIG. 3.

Equally spaced along the recess 22 are a plurality of novel retention assemblies 30. Each assembly 30 comprises a pressing member, shown as the clip 34 illustrated separately in FIG. 7. Each assembly 30 also comprises an engagement member shown as a detent 36, depicted isolated in FIGS. 8 and 9.

Referring first to the clip 34, each chip is made of carbon spring steel. Each clip 34 has a trunk 38 having a front surface 40 and a rear surface 42. Toward the bottom of trunk 39 is a slot 44 which divides the clip into a pair of legs 46. At the bottom of each leg 46 is an integral upturned foot 48. Each foot has at each corner at integral toe 49 which bends inwardly from foot 48 at an angle of approximately 45°.

Near the top of the trunk 38, a pair of substantially flat generally rectangular shoulders 50 project forwardly parallel to each other. From each shoulder 50 extends a substantially flat triangular arm 51, each having a lower slanted edge 52 and an upper slanted edge 53, which merge into a point 54. Each shoulder 50 and arm 51, have a coextending substantially flat inner surface 55. Trunk 38 has a pair of circular holes 56 extending therethrough.

At the top of trunk 38, or near the top, the clip 34 has an integral curved head flange 57 projecting rearwardly therefrom. Flange 57 has an exterior surface 59. The rearwardly most part of surface 59 is the surface section 61, which, when the assembly 30 is installed, presses against a wheel wall as will be described.

Referring now to the detent 36, the detent can be of plastic, such as nylon. It has a body 66 with a substantially flat rear surface 68, and a substantially flat head surface 70. On the front side of the detent 36 at the upper portion thereof, extends a nose 72. Nose 72 has lower and upper slanted surfaces 74 and 76 which join at a rounded peak 78. The radius of curvature peak 78 is about 0.1 inch (0.65 cm). Until the surfaces 74 and 76 begin rounding into peak 78, they are substantially flat. The nose has side walls 79 which are substantially flat.

Beneath the nose 72, detent 36 has a bottom section 82, which has a substantially flat front surface 84 and a substantially flat lower edge 86. A pair of lock bosses 90 project from the rear detent surface 68. Bosses 84 are circular to snugly extend telescopically through clip holes 56.

As seen in the drawings, when mounted, the detent rear body surface 68 fits flush against the front surface 40 of clip trunk 38. The bosses 90 can be heated as by a sonic weld or a heat stake, to expand the outer ends thereof as at 90° (FIG. 5) to thus interlock the detent 36 to the clip 34. As seen more particularly in FIGS. 2, 3 and 6, the detent sides 79 fit flush against the inside shoulder and arm surfaces 55. The lower and upper slanted arm edges 52 and 53 are each spaced about 0.04 in. (0.10 cm.) inward from the lower and upper slanted surfaces 74 and 76 of detent nose 72, respectively, and arm point 54 is likewise about the same distance from the rounded surface of detent peak 78. This distance is shown exaggerated in the drawings, for example, see FIG. 10.

Referring particularly to FIG. 4, the cover 20 and an assembly 30 are shown with a wheel 94 having the usual flange wall 96. A tire rim 98 is secured by conventional means to wheel 94. Rim 98 has an annular groove 100. Groove 100 extends into a rim wall 102 which passes into a curved bend 103, and thence into a flange 104, as known in the art.

In operation, each of the assemblies 30 can be installed by hand in the cover recess 22. This is done by first moving the interlocked assembly 30, such as shown in FIG. 5, to align the clip slot 44 with an appropriate rib 28 extending across the cover recess 22. The clip trunk 38 and the clip feet 48 are aligned to fit within the recess 22. The hand then exerts downward force against the clip head flange 57 and the upper edges of clip trunk 38 and shoulders 50. If desired, a small board can be placed atop the head flange 55, and the top edges of trunk 38 and shoulders 50. The hand can press the board downward for a more even distribution of force.

The assembly 30 is pressed down to the position shown in FIGS. 1-4. In this position, the lower ends of the feet 48 abut the recess floor 27 (FIGS. 3 and 4). As such downward movement occurs, recess walls 24 and 26 force the feet 48 and toes 49 toward the legs 46 to facilitate insertion. When the assembly 30 is in the FIGS. 1-4 position, the toes 49 dig into the recess wall 24 to resist movement of clip 30 from cover 20. The spacing of ribs 28 provides for installing eight assemblies 30 with the cover 20, in FIG. 1, although a greater or smaller number can be used depending upon the shape and size of the cover, the wheel and the tire rim involved.

The wheel cover 20 is mounted to the tire rim 98 as follows. The cover 20 is held so that each assembly 30 is aligned to be between the wheel wall flange 96 and the tire rim wall 102. The cover 20 is then moved inwardly. With such inward movement, each detent nose peak 78 first slides against the surface of rim wall 102. With such sliding, the inner cover wall 24 moved a slight distance inward. However, such inward movement is much less than that movement of the same wall shown as in the U.S. Pat. No. 4,895,414, because the detent nose 72 of the present assembly does not need to project as far outwardly in view of the retention force of head flange 57, and the arms 51, likewise do not so project, to cause significant movement of the wall 24. The cover 20 continues to be moved inwardly until the curved end surface 61 of the clip head flange 59 engages tire wall 96. When this occurs, the flange 59 acts like a coil spring and is compressed so that its outer end moves toward the rear clip wall 42. During the time that the detent nose 78 rests against rim wall 103 and the clip head flange surface 61 presses against wheel wall 96, there is application of force against both the front and the rear of the clip 34. As a result, the cover's inner wall 24 is not distorted inwardly, such as occurs during installation of the assemblies of said U.S. Pat. No. 4,895,414.

As the assemblies 30 continue to be moved toward the wheel 94 and rim 98, the detent nose 78 comes to the edge of groove 100. From this point, as the assemblies 30 continue to be moved toward the groove 100, the detent nose 72 moves into groove 100 with the peak 78 and lower nose surface 74 being pressed by force from head flange 98, to bear against the surface of groove 100. As the detent nose peak 78 travels along the surface of rim groove 100, there continues to be an application of force on both the front and rear of the clip 34 by virtue of the pressing action of detent 36 against the front clip surface 40, and by the pressing by the head flange 59 against the rear of the clip. The assemblies 30 continue to so move until they each reach a position such as illustrated in FIG. 4. In this position, the lower nose surface 74 and the peak 78 are pressed against groove 100 by the force of head flange 59. Hence, the presence of the counteracting forces exerted through the detent 36 and the head flange 59 prevent the cover walls 24 and 26 from being disfigured and distorted. Because the shape of the walls 24 and 26 remain intact, the feet 48 and the gripping toes 49 remain securely lodged within the cover recess 22.

The slick self-lubricating plastic surface of the detent facilitates the sliding of the detent along the tire rim wall 102 and along groove 100.

When the assemblies 30 are mounted as seen in FIG. 4, the lower detent edge 86 has a clearance of about 0.002 in. (0.013 cm) to about 0.004 in. (0.026 cm) above the top of cover wall 26. This small gap facilitates the inward flexing of head flange 59 during insertion and allows some movement of the detent 36 toward wall 26 without encouraging jamming of the detent 36 and head flange 59 during insertion.

With the assembly 30 mounted as seen in FIG. 4, the clip arms 51 are in position to act as secondary or safety retention means. If for some reason the detent 36 wears down so that its lower surface 74 or peak 78 recedes to be inside the arm lower edge 52 or point 54, then the edge 52 or point 54 will engage against the groove 100 to retain the cover 20 to the rim 98. Likewise, should for some reason the detent 36 crack or otherwise become deformed, the arms lower edges 52 and points 54 will engage against the groove 100 to retain the cover 20.

To remove the cover 20 from the rim 98, a leverage tool such as a tire tool can be inserted to pry the cover off of the rim and wheel, as is commonly done in the art in removing wheel covers. The digging action of the toes 49 maintains the assemblies 30 in mounted position with the cover 20. The installation of the assemblies 30 as heretofore described is such that it is a permanent mounting of the assemblies 30 to the cover 20.

When the assemblies 30 are mounted as described, the resistance offered by the ribs 28 against the clips 34 prevents rotation of the cover 20 relative to the wheel 94 and rim 98. This mounting prevents the assemblies 30 from moving relative to one another as well.

The clip 34 can be stamped from a single sheet of metal, such as heat treatable carbon spring steel, and bent and cut to form the integral unitary clip described. The detent 36 can be molded to be unitary.

In a preferred embodiment, the height of the detent from its top surface 70 to its lower edge 86 is approximately 0.72 inches (1.83 cm). The distance from the top detent surface 70 to the center of the cylindrical plugs 90 shown in FIG. 8 is approximately 0.45 inches (1.14 cm). The width of the detent from side to side is about 0.865 inches (2.20 cm). The vertical height nose 72 from the bottom edge of lower slanted surface 76 to the top edge of upper slanted surface 76, i.e. top edge 70, is approximately 0.4 inches (1.02 cm). The projection of nose peak 78 outwardly from the detent rear surface 68 is about 0.262 inches (0.67 cm). The thickness of the detent head surface 70 is about 0.082 inches (0.21 cm). The thickness of the bottom detent section 82 is about 0.117 inches (0.30 cm). The distance from the central axis of both bosses 90 from the top detent surface 70 is about 0.45 inches (1.14 cm).

In a preferred embodiment, the clip trunk 38 has a width of about 0.875 inches (2.22 cm). The distance from the outer surface of each of the shoulders 50 is about 0.91 in. (2.31 cm). Before application of any force to the head flange 59, its projection from its rear surface 61 to the front clip surface 40 is about 0.49 in. (1.24 cm). The radius of curvature of the principal portion of the head flange is 0.375 inches (0.95 cm) while that of the smaller curvature, which forms approximately a half circle and of which the end surface 61 is a part, is about 0.0375 in. (0.095 cm). The tip of the toes 49 project about 0.16 inches (0.41 cm) from the front clip surface 40. The height of the clip 34 from the bottom of the feet 48 to the top edge of the clip trunk, i.e. the top of the shoulders 50, is about 1.44 inches (3.66 cm). The height of each shoulder 50 is about 0.47 inches (1.19 cm). The height of each arm 51 at its juncture with shoulder 50 is about 0.35 in (0.89 cm.) The distance from the rear trunk surface 42 to the arm points 54 is about 0.27 in. (0.69 cm.) The head flange 57 is about 0.50 inches (1.27 cm) wide.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a wheel cover for an automotive vehicle wheel having a rim, the rim having an exterior annular groove with an interior surface, the wheel having a wall facing the said annular groove, the cover having an annular recess with an inner wall;

an improved wheel cover attachment assembly, comprising:

(a) a pressing member for mounting to the wheel cover, the pressing member having a trunk with an integral foot extending therefrom for fitting within the cover recess, the pressing member having unitary springlike extension projecting rearwardly from the trunk for engaging the wheel wall so that such engagement applies an outwardly directed force to the pressing member;

(b) a detent member for fitting with the pressing member, the detent member comprising a resilient self-lubricating material, and having a unitary projecting nose with a front surface and rear surface, that projects in a direction generally opposite the direction of the pressing member extension, so that when the pressing member extension contacts the wheel during insertion and the detent projection nose contacts the rim, the force applied by the extension against the pressing member counteracts the force applied by the projection against the pressing member so that the net effect of the forces results in insubstantial movement of the cover recess inner wall;

(c) the distance that the extension extends toward the wall is greater than the distance the projection extends toward the groove; and (d) the pressing member extension begins to curve away from the trunk of the pressing member from a point that is adjacent the abutment of the rear surface of the detent projection against the front surface of the trunk.

2. The wheel cover attachment assembly of claim 1 wherein the length of the extension extending toward the wall is about 1.8 times the length the projection extending toward the groove.

3. The wheel cover attachment assembly of claim 1 wherein the length of the extension extending toward the wall is more than 1.5 times the length of the projection extending toward the groove.

4. In a wheel cover for an automotive vehicle wheel having a rim, the rim having an interior annular groove with an interior surface, the wheel having a wall facing the said annular groove;

an improved wheel cover attachment assembly comprising:

(a) a pressing member for mounting to the wheel cover, the pressing member having a trunk section with a front surface and a rear surface, the pressing member having an integral and unitary extension which has a springlike structure, the extension extending in a rearward direction from the front surface of the pressing member, the extension having a first portion that initially extends to curve upwardly and rearwardly from the pressing member, the first portion extending into a second portion that engages the wheel wall; and (b) a detent member mounted with the pressing member, the detent member being separate from the pressing member and made of a different material than the pressing member, the detent member having a rear surface that abuts the front surface of the trunk of the pressing member, the detent member having a projection for contacting the rim and fitting within the annular rim groove, the projection having a front surface and rear surface, the projection being positioned to extend in a direction relative to the pressing member that is different than the direction of the pressing member extension, so that when the pressing member extension contacts the wheel during insertion and the detent projection contacts the rim, the force applied by the extension against the pressing member counteracts the force applied by the projection against the pressing member;

(c) the extension of the pressing member extending a greater distance from the front surface of the trunk of the pressing member than does the detent member projection extend from the front surface of the pressing member trunk, before application of force to the extension; and (d) the first portion of the extension extending from the second portion in the direction of the detent projection so that the force exerted by the pressing member is directed to the rear surface of the detent projection.

5. The wheel cover attachment assembly of claim 4 wherein the maximum thickness of the detent projection is less than about 0.3 in. (0.8 cm).

6. The wheel cover attachment assembly of claim 4 wherein the maximum thickness of the detent projection member is no greater than 0.35 in. (0.89 cm).

7. The wheel cover attachment assembly of claim 4 wherein the pressing member comprises spring steel and wherein the detent member projection comprises plastic.

8. The wheel cover attachment assembly of claim 4 wherein the detent member comprises a resilient, self-lubricating material.

9. The wheel cover attachment assembly of claim 8 wherein the detent member comprises nylon.

10. The wheel cover attachment assembly of claim 4 further comprising means for holding the pressing member to the cover to resist removal therefrom.

11. The wheel cover attachment assembly of claim 10 wherein the means for holding comprises the pressing member having a trunk, the trunk having at least one foot projecting outwardly therefrom for engaging the cover and wherein the extension and the foot are unitary with the pressing member.

12. The wheel cover attachment assembly of claim 4 further comprising interlocking means for locking the pressing member with the cover to resist movement of the pressing member along the cover.

13. The wheel cover attachment assembly of claim 4 wherein the fastening means comprises a boss on one of the members interacting with a hole in the other member.

14. The wheel cover attachment assembly of claim 4 wherein the detent projection has a slanted under-surface which extends into a peak.

15. The wheel cover attachment assembly of claim 4 wherein the pressing member comprises a trunk and the arm extends from the trunk, with the extension of the arm from the trunk being within the length of the projection of the surface of the detent projection from the trunk, so that if the detent is deformed to lose retention contact with the groove, the arm of the pressing member will engage with groove to retain the cover.

16. The wheel cover attachment assembly of claim 4 wherein the detent projection has a nose with a lower surface and the pressing member arm has a lower edge that extends along toward the inside of the lower surface of the nose.

17. The wheel cover attachment assembly of claim 4 wherein the distance that the extension extends from the front surface of the pressing member is greater than about 1.5 times the distance that the detent projection extends from the front surface of the pressing member.

18. The wheel cover attachment assembly of claim 4 wherein the distance that the extension extends from the front surface of the pressing member is about 1.8 times the distance that the detent projection extends from the front surface of the pressing member.

19. The wheel cover attachment assembly of claim 4 wherein the extension extends rearwardly about 0.50 in. (1.27 cm.) from the front surface of the trunk of the pressing member, and the detent projection extends about 0.26 in. (0.67 cm.) from the front surface of the pressing member trunk.

20. In a wheel cover for an automotive vehicle wheel having a rim, the rim having an interior annular groove with an interior surface, the wheel having a wall facing the said annular groove;

an improved wheel cover attachment assembly comprising:

(a) a pressing member for mounting to the wheel cover, the pressing member having a top, and an integral and unitary extension extending from near the top of the pressing member for engaging the wheel wall so that such engagement applies an outwardly directed force to the pressing member, the extension of the pressing member having a springlike structure and a curved shape, said curved shape comprising a curve formed of first and second radii of curvature of different lengths, the first radius of curvature being for a first portion of the extension closest to the pressing member, and the second radius of curvature being for a second portion of the extension that is farther from the pressing member than the first portion, the second portion curving back toward the pressing member, the first radius of curvature being at least five times larger than the second radius of curvature; and (b) a detent member mounted with the pressing member, the detent member having a projection for contacting the rim and fitting within the annular rim groove, the projection being positioned to extend in a direction relative to the pressing member that is generally opposite the direction of the pressing member extension, so that when the pressing member extension contacts the wheel during insertion and the detent projection contacts the rim, the force applied by the extension against the pressing member counteracts the force applied by the projection against the pressing member.

21. The wheel cover attachment assembly of claim 20 wherein the second portion having the second radius of curvature has a such curvature forming a semicircular shape.

22. The wheel cover attachment assembly of claim 20 wherein the first radius of curvature is about ten times larger than the second radius of curvature.

23. In a wheel cover for an automotive vehicle wheel having a rim, the rim having an interior annular groove with an interior surface, the wheel having a wall facing the said annular groove;

an improved wheel cover attachment assembly comprising:

(a) a pressing member for mounting to the wheel cover, the pressing member having a top, and an integral and unitary extension extending from near the top of the pressing member for engaging the wheel wall so that such engagement applies an outwardly directed force to the pressing member, the extension of the pressing member having a springlike structure and a curved shape, said curved shape comprising a curve formed of first and second radii of curvature of different lengths, the first radius of curvature being for a first portion of the extension closest to the pressing member, and the second radius of curvature being for a second portion of the extension that is farther from the pressing member than the first portion, the second portion curving back toward the pressing member, the first radius of curvature being at least five times larger than the second radius of curvature; and (b) the assembly having a detent member associated with the pressing member, the detent member having a projection for contacting the rim and fitting within the annular rim groove, the projection extending in a direction generally opposite that of the extension, so that when the extension contacts the wheel during insertion and the detent projection contacts the rim, the detent member having a rear surface that abuts the pressing member and the detent projection having a rear surface, the force applied by the extension against the pressing member counteracts the force applied by the projection against the pressing member; and (c) the distance that the extension extends being greater than the distance that the projection extends when force is applied to the extension and when the extension engages against the wheel and when the detent fits within the annular groove; and (d) the first portion of the extension begins to curve away from the trunk of the pressing member from a point that is adjacent the abutment of the rear surface of the detent against the pressing member, said point being adjacent to the detent projection, the first portion of the extension extending from the second portion in the direction of the detent projection so that the force exerted by the pressing member is directed to the rear surface of the detent projection.

* * * * *